United States Patent Office 3,833,573
Patented Sept. 3, 1974

3,833,573
PHENOTHIAZINE DERIVATIVES
Daniel Farge, Thiasis, and Mayer Naoum Messer, Bievres, France, assignors to Rhone-Poulenc S.A., Paris, France
No Drawing. Filed Mar. 1, 1972, Ser. No. 231,014
Claims priority, application France, Mar. 3, 1971, 7107286
Int. Cl. C07d 93/14
U.S. Cl. 260—243 A
1 Claim

ABSTRACT OF THE DISCLOSURE (7-Hydroxy-3-phenothiazinyl)alkanoic acids—the numbering of the phenothiazine ring being in accordance with Beilstein—are prepared by a new multi-stage process involving reaction of 2,5-dihydroxy-thiophenol with a nitrophenyl-alkanoic acid, reduction of the resulting [3-nitro-4-(2,5 - dihydroxy - phenylthio)phenyl]alkanoic acid to the corresponding amino-diphenolic compound, oxidation of the amino-diphenol to the corresponding quinone which cyclises spontaneously into a (7-oxo-3-phenothiazinyl)alkanoic acid, and reduction of the said acid to a (7-hydroxy-3-phenothiazinyl)alkanoic acid. The products are useful as starting materials for the preparation of alkyl esters of (7-alkoxy-3-phenothiazinyl)alkanoic acids, from which therapeutically useful phenothiazine derivatives can be obtained.

---

This invention relates to new phenothiazinyl-alkanoic acids of the general formula:

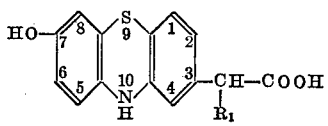
I wherein $R_1$ represents a hydrogen atom or a methyl or ethyl radical, to a process for their preparation and their use in the preparation of esters of the general formula:

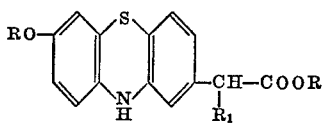
II wherein $R_1$ is as hereinbefore defined and R represents an alkyl radical containing 1 to 4 carbon atoms.

According to the present invention, the phenothiazinyl-alkanoic acids of the general formula I are prepared by the process which comprises carrying out sequentially the following operations:

(a) reacting 2,5-dihydroxy-thiophenol with an acid of the general formula:

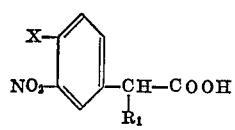
III wherein $R_1$ is as hereinbefore defined and X represents the acid residue, of a reactive ester such as a halogen (preferably chlorine) atom, (b) reducing the resulting [3-nitro-4-(2,5-dihydroxyphenylthio)phenyl]alkanoic acid of the general formula:

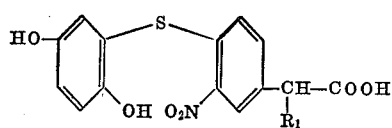
IV (wherein $R_1$ is as hereinbefore defined) to the corresponding amino compound of the general formula:

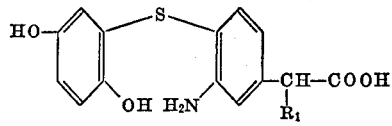
V wherein $R_1$ is as hereinbefore defined, (c) oxidising the diphenol obtained to the corresponding quinone, which cyclises spontaneously into a (7-oxo-phenothiazinyl)alkanoic acid of the general formula:

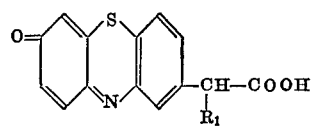
VI wherein $R_1$ is as hereinbefore defined, and (d) reducing the acid of the general formula VI to a (7-hydroxy-3-phenothiazinyl)alkanoic acid of the general formula I.

The condensation of the 2,5-dihydroxy-thiophenol with the acid of general formula III is generally carried out in an organic solvent, for example dimethylformamide or ethanol, in the presence of an alkaline condensation agent such as sodium hydroxide.

The reduction of the acid of general formula IV to the amino compound of general formula V can be carried out by any known method for the reduction of the nitro radical to an amino radical without modifying the remainder of the molecule. Generally the reduction is carried out by hydrogen in the presence of a catalyst such as palladium on charcoal, or otherwise by hydrogenation using chemical reagents such as iron in acetic acid.

The oxidation of the diphenol of general formula V to the corresponding quinone can be carried out according to the usual methods employed for oxidising phenols to quinones. More particularly, ferric chloride in an aqueous medium at a temperature of about 15° C. to 25° C. or iodine in dimethylsulphoxide, is used as the oxidising agent. The quinone formed cyclises spontaneously into an acid of the general formula VI.

The reduction of the acid of the general formula VI to a (7-hydroxy-3-phenothiazinyl)alkanoic acid of the general formula I can be carried out according to the usual methods employed for the reduction of quinones to phenols. Preferably sodium hydrosulphite in an aqueous alcoholic solution, or zinc in aqueous dioxan, is used.

The acids of general formula I can optionally be purified by physical methods such as distillation, crystallisation or chromatography, or by chemical methods such as the formation of metal salts, in particular alkali metal or alkaline earth metal salts, or addition salts with organic bases containing nitrogen, followed by the decomposition of these salts in an acid medium.

According to a feature of the invention, the phenothiazinyl-alkanoic acid esters of general formula II are prepared by the process which comprises reacting a compound of the general formula:

R—Y     VII (wherein R is as hereinbefore defined, and Y represents the acid residue of a reactive ester such as a halogen atom or a sulphuric or sulphonic ester radical) with an acid of general formula I. The reaction is carried out, optionally in an organic solvent such as an alcohol containing 1 to 4 carbon atoms, or a ketone, in the presence of an alkaline condensation agent such as potassium carbonate, and at a temperature between 25° C. and the boiling point of the reaction mixture.

The esters of general formula II can be purified by physical methods such as distillation, crystallisation or chromatography.

The phenothiazinyl-alkanoic acid esters of general formula II are particularly useful as intermediates in the preparation of phenothiazinyl-alkanoic acids of the general formula:

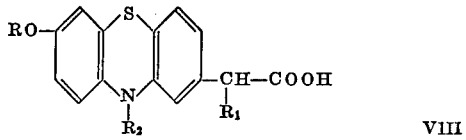

wherein R and $R_1$ are as hereinbefore defined, and $R_2$ represents a hydrogen atom or a methyl radical. The compounds of general formula VIII, and in particular 2-(10-methyl-7-methoxy-3-phenothiazinyl)propionic acid, possess valuable anti-inflammatory properties. These acids of general formula VIII and their preparation have been described in the specifications of British Pats. Nos. 1,048,-680 and 1,142,760 granted to the assignees of the present application, Rhone-Poulenc S.A., on applications filed 27th October, 1965 and 23rd January, 1968, respectively.

According to a process described in the aforesaid British patents, the acids of general formula VIII can be obtained by the hydrolysis of a phenothiazine derivative of the general formula:

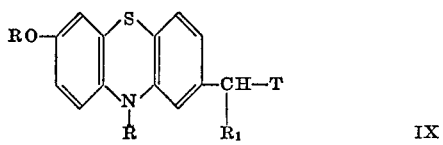

wherein R, $R_1$ and $R_2$ are as hereinbefore defined, and T represents a radical known to be capable of conversion to a carboxy radical by hydrolysis, such as a lower alkoxycarbonyl, cyano or carbamoyl group.

The derivatives of phenothiazine of general formula IX, wherein R and $R_1$ are as hereinbefore defined, $R_2$ represents a hydrogen atom and T represents a lower alkoxycarbonyl radical, can be obtained by the cyclisation by heating at a temperature between 100° C. and 200° C. in a saturated hydrocarbon of high boiling point of a diphenyl sulphide of one of the general formulae:

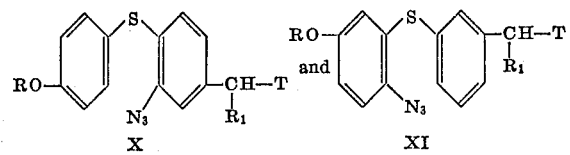

(wherein R, $R_1$ and T are as hereinbefore defined), themselves obtained from the corresponding amines of the general formulae:

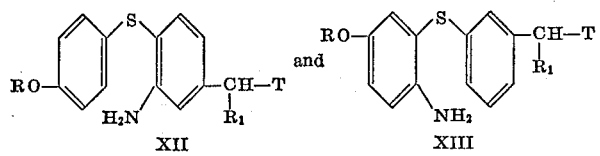

(wherein R, $R_1$ and T are as hereinbefore defined) by diazotisation of the amino radical and the action of sodium azide on the resulting diazonium salts in water at about 0° C., which amino compounds of general formulae XII and XIII are obtained from the corresponding nitro compounds of the general formula:

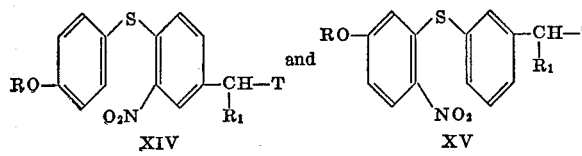

(wherein R, $R_1$ and T are as hereinbefore defined) by reduction by methods known per se, for example by catalytic reduction in the presence of palladium.

The nitro-diphenyl sulphide starting materials of general formula XIV can themselves be obtained according to the following reaction:

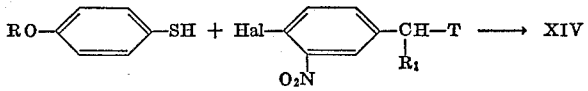

and the nitro-diphenylsulphide starting material of general formula XV can be obtained according to the following reaction:

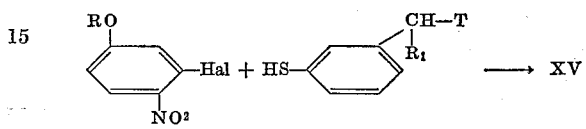

wherein R, $R_1$ and T are as hereinbefore defined, and Hal represents a halogen atom.

The phenothiazine derivatives of general formula IX, wherein R and $R_1$ are as hereinbefore defined, T represents a lower alkoxycarbonyl radical and $R_2$ represents a methyl radical, can be obtained by the methylation of a compound of general formula IX wherein $R_2$ represents a hydrogen atom.

The process of the invention for the preparation of the phenothiazinyl-alkanoic acid esters of general formula II enables the said compounds, and consequently the acids of the general formula VIII, to be obtained in very considerably better yields in comparison with those obtained with the aforementioned previously known processes.

The following Examples, in which the nomenclature of the phenothiazine ring is in accordance with that of Beilstein, illustrate the process of the invention.

EXAMPLE 1

An aqueous solution of sodium hydroxide ($d=1.33$; 3.54 litres) is added over a period of 1 hour, under a nitrogen atmosphere, to a solution, maintained at between 5 and 8° C., of 2-(4-chloro-3-nitrophenyl)propionic acid (3.75 kg.) and of 2,5-dihydroxy-thiophenol (2.78 kg.) in dimethylformamide (32.2 litres). The reaction mixture is then heated for 2 hours at 60° C. After cooling, the reaction mixture is poured into distilled water (80 litres) containing crushed ice (28 kg.) and sulphuric acid ($d=1.83$; 3.5 litres). Extraction is carried out with methylene chloride (45 litres). The organic layers are washed three times with water (total 45 litres), and then the solvent is evaporated under reduced pressure (20 mm. Hg at 40–45° C., then 3 mm. Hg at 75–80° C.). The oil obtained is poured into water (52 litres). The product which crystallises is filtered off, washed three times with water (total 7.5 litres) and dried in air at a temperature of about 20° C. The crude product is treated with boiling diisopropyl ether (11 litres) for 15 minutes. The product is filtered off, washed three times with diisopropyl ether (total 5.1 litres) and dried under reduced pressure (20 mm. Hg) for 20 hours at 20° C. to give 2-[3-nitro-4-(2,5-dihydroxy-phenylthio)phenyl]propionic acid (4.62 kg.) melting at 192–194° C.

2 - [3 - Nitro-4-(2,5-dihydroxy-phenylthio)phenyl]propionic acid (2.615 kg.) is dissolved in methanol (12.6 litres). The nitro group in the compound is reduced to amino by hydrogen under a pressure of 20 bars in the presence of palladium on charcoal (780 g.) containing 3.15% palladium.

The catalyst is filtered off and then washed with methanol (0.65 litre). The methanolic solution, which contains 2 - [3 - amino-4-(2,5-dihydroxy-phenylthio)phenyl]propionic acid (theoretically 2.380 kg.), is poured into distilled water (55 litres). A solution of ferric chloride ($d=1.26$; 11.9 litres) is added over a period of 1 hour 30 minutes to the solution obtained. The product which crystallises is filtered off, washed three times with water (total 3 litres) and dried in air at a temperature of about 20° C.

The crude 2-(7-oxo-3-phenothiazinyl)propionic acid thus obtained is dissolved in ethyl acetate (20 litres). This solution is added rapidly to 80% sodium hydrosulphite (2.78 kg.) in distilled water (13 litres). The mixture is then stirred for 7 hours 30 minutes. After decantation, the aqueous phase is extracted with ethyl acetate (3 litres). The organic phases are washed with an aqueous solution (3 litres) of 80% sodium hydrosulphite (50 g. per litre), and then dried over anhydrous sodium sulphate.

After filtration, the organic solution is concentrated to dryness under reduced pressure (25 mm Hg, then 4–5 mm. Hg) at 45° C. The product obtained is dried for 16 hours under reduced pressure (25 mm. Hg) at 20° C. to give 2-(7-hydroxy-3-phenothiazinyl)propionic acid (2.12 kg.) melting at 248–250° C.

2 - (4 - Chloro-3-nitrophenyl)propionic acid, used as starting material, can be prepared in the following manner:

2 - (4 - Chlorophenyl)propionic acid (2.89 kg.) is dissolved in pure sulphuric acid ($d=1.83$; 15.87 litres) at a temperature of about 7° C. The mixture is stirred for 15 hours, and then, after cooling to 5° C., sodium nitrate (1.506 kg.) is added in small portions over a period of 1 hour 30 minutes, keeping the temperature at between 5° and 10° C.

After completion of the addition, stirring is continued for a further 30 minutes, and then the reaction mixture is poured onto crushed ice (90 kg.). The product which crystallises is filtered off, washed three times with water (total 15 litres) and then dried under reduced pressure (20 mm. Hg) at 20° C. After recrystallisation from a mixture of diisopropyl ether-cyclohexane (5–5 by volume; 6.1 litres), 2-(4-chloro-3-nitrophenyl)propionic acid (2.77 kg.), melting at 87–88° C., is obtained.

2-(4-Chlorophenyl)propionic acid (m.p. 47–48° C.) can be obtained by the oxidation of 2-(4-chlorophenyl)propanal by means of silver nitrate in an alkaline medium.

2-(4-Chlorophenyl)propanal (b.p. 69–73° C./2 mm. Hg) can be prepared by the reaction of ethyl chloroacetate with 4-chloroacetophenone followed by hydrolysis and decarboxylation of the glycidyl ester obtained.

2,5-Dihydroxy-thiophenol can be prepared according to the method described in the specification of U.S. Pat. 2,979,513.

EXAMPLE 2

Methyl sulphate (3.63 kg.) is added over a period of 15 minutes to a mixture of 2-(7-hydroxy-3-phenothiazinyl)propionic acid (3.31 kg.), acetone (30 litres) and potassium carbonate (4.76 kg.), kept under a nitrogen atmosphere. The mixture is then heated under reflux for 2 hours 40 minutes until the evolution of gas ceases, and then the reaction mixture is poured into distilled water (80 litres) containing crushed ice (20 kg.). The precipitate is filtered off, washed with water and dried at a temperature of about 20° C. for 40 hours.

The crude ester (3.5 kg.) so obtained is treated with boiling methanol (8.75 litres) for 30 minutes. The product is filtered off and then redissolved in methanol (4 litres) at a temperature of about 20° C. for 1 hour. After filtering off, the product is dried under reduced pressure (20 mm. Hg) for 40 hours at a temperature of about 20° C. It is then recrystallised from a mixture (13 litres) of equal parts of methanol and acetonitrile to yield methyl 2-(7-methoxy-3-phenothiazinyl)propionate (2.06 kg.).

A second operation starting from 2 - (7 - hydroxy - 3-phenothiazinyl)propionic acid (4.3 kg.) yields methyl 2-(7-methoxy-3-phenothiazinyl)propionate (3.62 kg.).

The methanolic wash liquids and the crystallisation mother liquors from the two operations are concentrated to dryness and the residue is chromatographed over alumina (12 kg.). Elution is carried out with methylene chloride (32 litres). After evaporation of the eluate to dryness, methyl 2 - (7 - methoxy - 3-phenothiazinyl)propionate (2.36 kg.) is obtained.

The total yield of methyl 2-(7-methoxy-3-phenothiazinyl)propionate, melting at 140–144° C., is 8.04 kg.

We claim:
1. Process for the preparation of a (7-hydroxyphenothiazinyl)alkanoic acid of the formula:

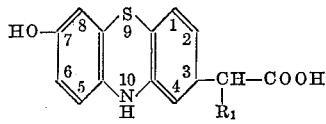

wherein $R_1$ represents hydrogen, methyl or ethyl, which comprises the following sequential steps:
(a) reacting 2,5-dihydroxy-thiophenol with an acid of the formula:

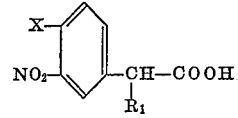

wherein $R_1$ is as hereinbefore defined and X is halogen, in an organic solvent in the presence of sodium hydroxide at about 60° C.,
(b) reducing the nitro group in the resulting [3-nitro-4-(2,5-dihydroxyphenylthio)phenyl]alkanoic acid of the formula:

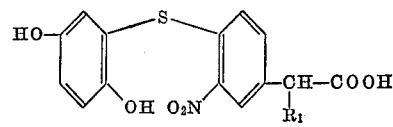

wherein $R_1$ is as hereinbefore defined, at ambient temperature with hydrogen in the presence of a palladium hydrogenation catalyst or with iron in acetic acid, to give the corresponding amino-diphenolic compound of the formula:

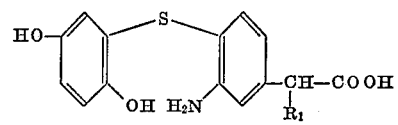

wherein $R_1$ is as hereinbefore defined,
(c) oxidising the amino-diphenolic compound with aqueous ferric chloride at about 15° to 25° C. or iodine in dimethyl sulphoxide to the corresponding quinone, which cyclises spontaneously into a (7-oxophenothiazinyl)alkanoic acid of the formula:

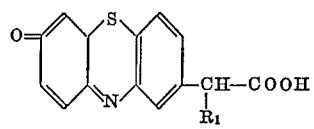

wherein $R_1$ is as hereinbefore defined, and
(d) reducing the (7-oxophenothiazinyl)alkanoic acid at ambient temperature with aqueous or aqueous alcoholic sodium hydrosulphite or with zinc in aqueous dioxan to a (7-hydroxyphenothiazinyl)alkanoic acid of the formula depicted hereinbefore.

References Cited
UNITED STATES PATENTS 3,519,622 7/1970 Sutton _____ 260—243
3,450,698 6/1969 Farge et al. _____ 260—243

HARRY I. MOATZ, Primary Examiner